(12) United States Patent
Lindsay et al.

(10) Patent No.: US 8,874,639 B2
(45) Date of Patent: Oct. 28, 2014

(54) DETERMINING ADVERTISING EFFECTIVENESS OUTSIDE OF A SOCIAL NETWORKING SYSTEM

(75) Inventors: Robert Taaffe Lindsay, San Francisco, CA (US); Sean Michael Bruich, Palo Alto, CA (US); Bradley Hopkins Smallwood, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 806 days.

(21) Appl. No.: 12/977,038

(22) Filed: Dec. 22, 2010

(65) Prior Publication Data

US 2012/0166520 A1  Jun. 28, 2012

(51) Int. Cl.
*G06F 15/16* (2006.01)
*G06Q 50/00* (2012.01)
*G06Q 30/02* (2012.01)

(52) U.S. Cl.
CPC .......... *G06Q 30/0241* (2013.01); *G06Q 50/01* (2013.01)
USPC .......................................... 709/203; 709/219

(58) Field of Classification Search
CPC ... G06Q 50/01; G06Q 30/0241; G06Q 30/02; G06F 15/16
USPC ................. 709/203, 219; 705/10, 14
See application file for complete search history.

(56) References Cited

U.S. PATENT DOCUMENTS

| | | | | |
|---|---|---|---|---|
| 5,848,396 A | * | 12/1998 | Gerace | 705/7.33 |
| 5,991,735 A | * | 11/1999 | Gerace | 705/7.33 |
| 8,041,806 B2 | * | 10/2011 | Gassewitz et al. | 709/224 |
| 8,099,316 B2 | * | 1/2012 | Moukas et al. | 705/7.29 |
| 8,140,384 B2 | * | 3/2012 | Almeida | 705/14.16 |
| 8,166,069 B2 | * | 4/2012 | Sample et al. | 707/783 |
| 8,229,788 B2 | * | 7/2012 | Nyhan et al. | 705/14.41 |
| 8,230,046 B2 | * | 7/2012 | Jiang | 709/219 |
| 8,250,145 B2 | * | 8/2012 | Zuckerberg et al. | 709/204 |
| 8,302,030 B2 | * | 10/2012 | Soroca et al. | 715/810 |
| 8,370,489 B2 | * | 2/2013 | Mazumdar et al. | 709/224 |
| 8,538,803 B2 | * | 9/2013 | Nicholas et al. | 705/14.1 |
| 2008/0065759 A1 | * | 3/2008 | Gassewitz et al. | 709/224 |
| 2008/0214148 A1 | * | 9/2008 | Ramer et al. | 455/414.1 |
| 2008/0228537 A1 | * | 9/2008 | Monfried et al. | 705/7 |
| 2009/0037255 A1 | * | 2/2009 | Chiu et al. | 705/10 |
| 2009/0070219 A1 | * | 3/2009 | D'Angelo et al. | 705/14 |
| 2009/0119167 A1 | * | 5/2009 | Kendall et al. | 705/14 |
| 2009/0132368 A1 | * | 5/2009 | Cotter et al. | 705/14 |
| 2009/0204476 A1 | * | 8/2009 | Abraham et al. | 705/10 |
| 2009/0248494 A1 | * | 10/2009 | Hueter et al. | 705/10 |
| 2009/0307083 A1 | * | 12/2009 | Nyhan et al. | 705/14.44 |
| 2010/0010866 A1 | * | 1/2010 | Bal et al. | 705/10 |
| 2010/0100445 A1 | * | 4/2010 | Flood et al. | 705/14.64 |

(Continued)

*Primary Examiner* — Anthony Mejia
(74) *Attorney, Agent, or Firm* — Fenwick & West LLP (57) ABSTRACT

A social networking system or other user registration site builds a log of exposures by users to advertisements outside of the user registration site to determine their effectiveness. For each user exposed to an advertisement, a log entry is created indicating that the user has been exposed to the advertisement. Tracking pixels are embedded into advertisements that, when accessed, enable the social networking system or user registration site to log access to the advertisement by the user. From the log files, the user registration site identifies exposed users and selects unexposed users with similar demographics and/or behavior information to generate a control group. The two groups can be surveyed about the advertisement to determine its effectiveness. The user exposure information also can be used to retarget advertisements, to measure advertising effectiveness on connections of exposed users, and to measure actions of exposed users.

34 Claims, 5 Drawing Sheets

(56) References Cited

U.S. PATENT DOCUMENTS

| | | | |
|---|---|---|---|
| 2010/0161411 A1* | 6/2010 | Wu et al. | 705/14.45 |
| 2010/0223119 A1* | 9/2010 | Klish | 705/14.26 |
| 2010/0241510 A1* | 9/2010 | Zhang | 705/14.45 |
| 2010/0324990 A1* | 12/2010 | D'Angelo et al. | 705/14.46 |
| 2011/0040613 A1* | 2/2011 | Simmons et al. | 705/14.42 |
| 2011/0055021 A1* | 3/2011 | Haag | 705/14.69 |
| 2011/0066497 A1* | 3/2011 | Gopinath et al. | 705/14.53 |
| 2011/0231868 A1* | 9/2011 | Martens | 725/13 |
| 2011/0258039 A1* | 10/2011 | Patwa et al. | 705/14.45 |
| 2011/0276396 A1* | 11/2011 | Rathod | 705/14.49 |
| 2011/0313814 A1* | 12/2011 | Briggs | 705/7.31 |
| 2011/0320250 A1* | 12/2011 | Gemmell et al. | 705/14.16 |
| 2011/0320373 A1* | 12/2011 | Lee et al. | 705/319 |
| 2012/0010941 A1* | 1/2012 | Park | 705/14.41 |
| 2012/0059722 A1* | 3/2012 | Rao | 705/14.66 |
| 2012/0130813 A1* | 5/2012 | Hicken et al. | 705/14.54 |
| 2012/0151383 A1* | 6/2012 | Kazan et al. | 715/753 |
| 2012/0191510 A1* | 7/2012 | Cameron | 705/12 |
| 2012/0214568 A1* | 8/2012 | Herrmann | 463/16 |
| 2012/0246677 A1* | 9/2012 | Fasting | 725/34 |
| 2012/0323675 A1* | 12/2012 | Paparo | 705/14.42 |
| 2013/0097311 A1* | 4/2013 | Mazumdar et al. | 709/224 |
| 2013/0198158 A1* | 8/2013 | Tijssen et al. | 707/706 |
| 2013/0325605 A1* | 12/2013 | Callaghan et al. | 705/14.53 |

* cited by examiner

DETERMINING ADVERTISING EFFECTIVENESS OUTSIDE OF A SOCIAL NETWORKING SYSTEM

BACKGROUND

This invention relates generally to social networking, and more particularly to determining advertising effectiveness among social network users for advertisements outside of a social networking system.

To determine the effectiveness of advertising, typically polls are issued to groups of people exposed to an advertisement or an advertising campaign, and to a control group of people not exposed to the same advertisement or campaign, who may be similar in other respects. However, in the context of users of a social networking system and advertising exposure outside of the social networking system, often there is not a readily available way to determine the exposed and control groups.

In a typical social networking system, such as a social networking website, users set up their user profiles and then establish connections with other users of the social networking system. The users often provide information about themselves expressly to the social networking system, such as demographic information and/or a list of the users' interests. Users may also provide information about themselves implicitly to the social networking system, through their actions on the system and interactions with other users. In this way, a social networking system can obtain a rich set of social information about its users, which may be used in a great many ways to enhance a user's experience online.

Users of a social networking system may be exposed to various online advertisements. If they occur within the social networking system, these exposures may be tracked by the social networking system. The social information about the users maintained by the social networking system may provide a rich set of data about the users and their exposures. However, advertisers typically cannot leverage this social information in the contact of advertising impressions that occur outside of the social networking system, and thus cannot use the information to determine the effectiveness of advertising.

SUMMARY

To assess effectiveness of advertisements outside the domain of a social networking system or other user registration site, the social networking system or registration site builds a log of exposures by users to advertisements outside of the social networking system or user registration site. For each user exposed to an advertisement, a log entry is created indicating that the user has been exposed to the advertisement. To build the log, tracking pixels are embedded into advertisements on web pages provided by third parties. When a user accesses an advertisement including a tracking pixel, the tracking pixel enables the social networking system or user registration site to log access to the advertisement by the user.

In one embodiment, the tracking pixel accesses a cookie on the user's device, from which it retrieves a user identifier and sends it to the social networking system or user registration site along with identification of the advertisement viewed. According to another embodiment, upon the user accessing the advertisement, the tracking pixel initiates a request from the user device for the associated image from the social networking system or user registration site, and sends a social networking system cookie or user registration site cookie stored on the user's device along with the request. From the request the social networking system or user registration site determines the associated user. The social networking system or user registration site logs access to the advertisement by the user. From the log files for various users who have accessed the advertisement, the social networking system or user registration site determines exposed users, and users not exposed who have similar demographics and/or behavior information to generate a control group. The two groups are surveyed about the advertisement to determine its effectiveness.

The user exposure information may also be used to retarget advertisements based on whether a user has been exposed to the advertisement, or based on the number of impressions for the user. For example, an advertiser can use the advertisement exposure information to determine whether to serve another advertisement to a particular user, based on whether multiple exposures to the same advertisement are desired or whether a second advertisement should be provided to a user exposed to a first advertisement.

The advertising exposure information may also be used for measuring advertisement effectiveness on connections of exposed users, e.g., by discussion of the advertisement between the user and the user's connections outside of the social networking system or user registration site.

The data also can be used to measure actions of exposed users within the social networking system or user registration site that relate to the advertising to which the user was exposed, e.g., "liking" or commenting on a product that is the subject of an advertisement to which the user was exposed. These actions provide another possible measure of the effectiveness of the advertisement beyond just a survey.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
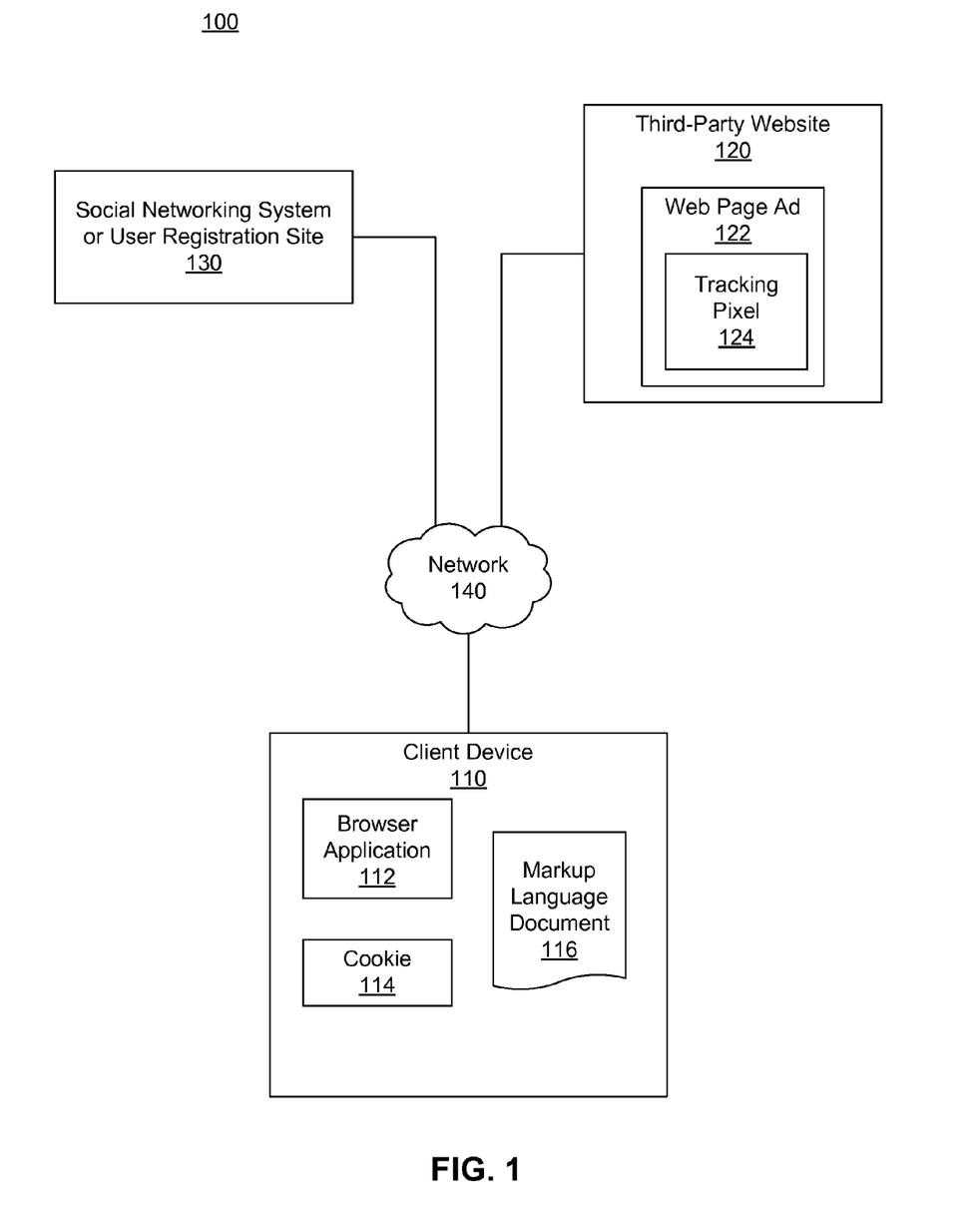
FIG. 1 is a network diagram of one embodiment of a system surveying advertising effectiveness for advertisements external to a social networking system.

FIG. 1 is a network diagram of one embodiment of a system 100 for providing interactions between advertising content and users of a social networking system 130, or user registration site. Although the example used herein is one of a social networking system, the system 100 could instead include any other type of user registration site. The system 100 includes one or more user devices 110, one or more third-party websites 120, the social networking system 130 and a website 140. For purposes of illustration, the embodiment of the system 100 shown by FIG. 1 includes a single third-party website 120 and a single user device 110. However, in other embodiments, the system 100 may include more user devices 110 and/or more third-party websites 120. In certain embodiments, the social networking system 130 is operated by the social network provider, whereas the third-party websites 120 are separate from the social networking system 130 in that they may be operated by different entities. In various embodiments, however, the social networking system 130 and the third-party websites 120 operate in conjunction to provide social networking services to users of the social networking system 130. In this sense, the social networking system 130 provides a platform, or backbone, which other systems, such as third-party websites 120, may use to provide social networking services and functionalities to users across the Internet.

The user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third-party website 120 and the social networking system 130 via the network 140, which may comprise any combination of local area and/or wide area networks, using both wired and wireless communication systems.

In one embodiment, the user device 110 displays content from the third-party website 120 or from the social networking system 130 by processing a markup language document 116 received from the third-party website 120 or from the social networking system 130 using a browser application 112. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page including a tracking pixel that can read a cookie 114 provided by the social networking system 130 or can redirect the browser 112 to the social networking system 130. In various embodiments, the markup language document 116 comprises a data file including extensible markup language (XML) data, extensible hypertext markup language (XHTML) data or other markup language data.

Figure 3A:
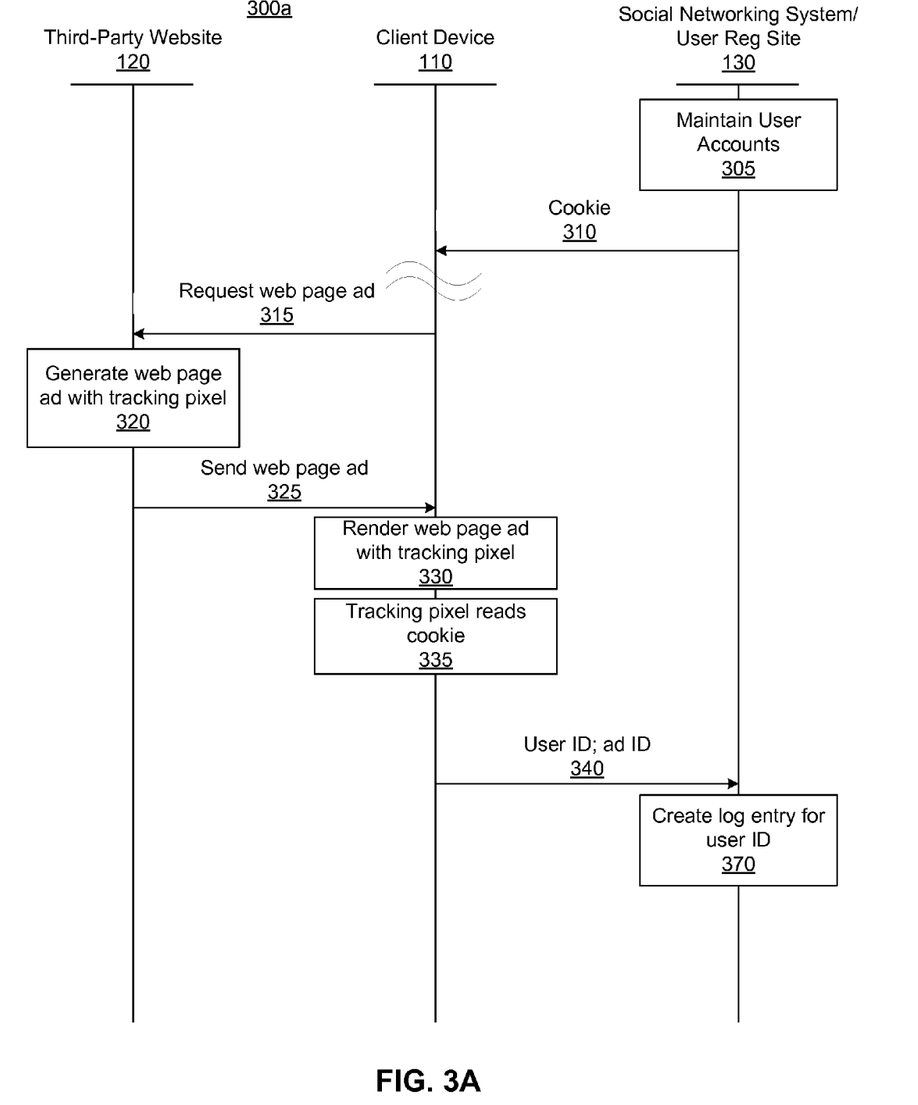
FIGS. 3A and 3B are interaction diagrams of processes for building a log of user advertising exposures outside of the social networking system, according to two embodiments of the present invention.
Figure 3B:
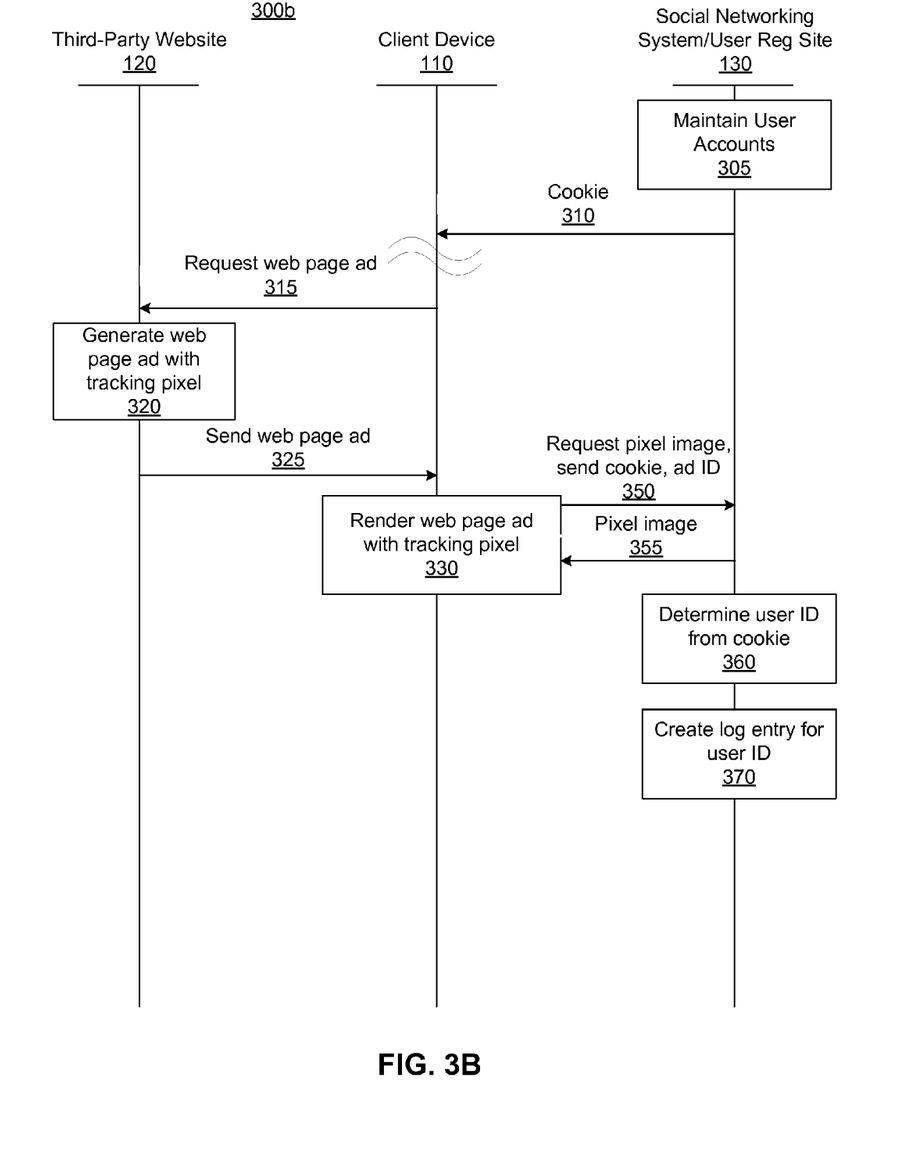

In one embodiment, the user device 110 also includes a cookie 114 including data indicating an identifier of a user account associated with the user of the device 110, identifying the client device 110 itself, and/or whether the user is logged into the social networking system 130. The cookie 114 indicates whether the user of the computing device 110 is involved in an active session where the user device 110 exchanges data with the social networking system 130, allowing modification of the data communicated from the social networking system 130 to the user device 110. Use of the cookie 114 in exchanging data between the user device 110, the social networking system 130 and/or the third-party website 120 is further described below in conjunction with FIG. 3.

The third-party website 120 comprises one or more web servers including one or more web page advertisements 122, which are communicated to the user device 110 using the network 140. The third-party website 120 is separate from the social networking system 130. For example, the third-party website 120 is associated with a first domain while the social networking website is associated with a separate social networking domain. A web page advertisement 122 included in the third-party website 120 comprises a markup language document identifying content and including instructions specifying formatting or presentation of the identified content, as described above. In one embodiment, a web page advertisement 122 includes a tracking pixel 124 comprising instructions that, when executed by a browser application 112 of a user device 110, retrieve the user account identifier from the cookie 114 or redirects the browser 112 to the social networking system 130, using the client device identifier to determine an associated user identification from the social networking system 130. The user account identifier, whether provided to the social networking system directly or derived from the social networking system cookie 114, provides a mechanism for the social networking system 130 to associate the web page advertisement 122 with the user. Hence, the tracking pixel 124 allows a web page advertisement 122 from the third party website 120 to access a user identifier associated with a user of the client device 110 for associating the advertising content with the user account identifier by the social networking system 130, which then stores the association in a log.

The social networking system 130 comprises one or more computing devices storing a social network, or mapping of a social graph, comprising a plurality of users and providing users of the social network with the ability to communicate and interact with other users of the social network. The social networking system 130 is further described below in conjunction with FIG. 2. In use, users of the social networking system 130 add connections to a number of other users of the social networking system 130 to whom they desire to be connected. As used herein, the term "friend" or the term "a connection" refers to any other user of the social networking system 130 to whom a user has formed a connection, association, or relationship via the social networking system 130. As indicated above, the system 100 alternatively could use a user registration site of a different type to provide the functionality described herein using the example of a social networking system.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user," "friend," and "connection" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in a third-party website 120, separate from the social networking system 130, coupled to the social networking system 130 via a network 140.

The social networking system 130 is also capable of connecting a variety of entities. For example, the social networking system 130 enables users to interact with each other as well as third-party websites 120 or other entities through an API or other communication channels.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 110. Posts may include data such as status updates or other textual data, location information, photos, videos, links, music or other similar data, content and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 130.

Figure 2:
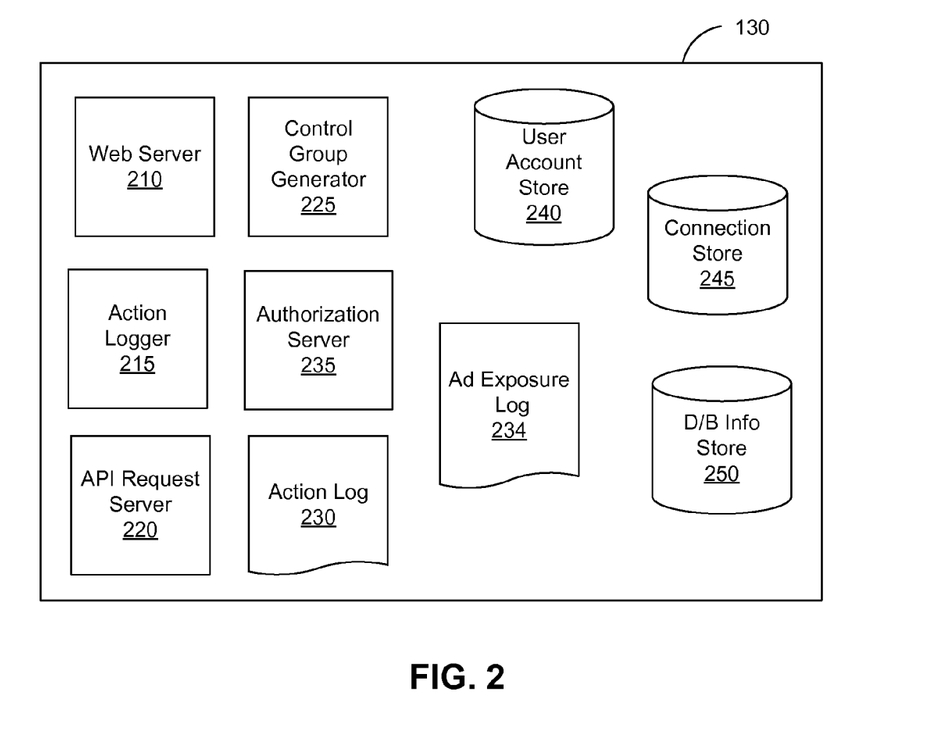
FIG. 2 is a diagram of one embodiment of a social networking system.

FIG. 2 is a diagram of one embodiment of a social networking system 130. The embodiment of a social networking website 130 shown by FIG. 2 includes a web server 210, an action logger 215, an API request server 220, a control group generator 225, an action log 230, an ad exposure log 234, an authorization server 235, a user account store 240, a connection store 245, and a demographics and behavioral information store 250. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network. The user profiles include biographic, demographic, and other types of descriptive information, such as work experience, educational history, hobbies or preferences, interests, location, and the like. The social networking system 130 further stores data describing one or more connections between different users. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system to one or more client devices 110 and/or one or more third-party websites 130 via the network 140. The web server 210 serves web pages, as well as other web-related content, such as Java, Flash, XML, and so forth. The web server 210 may include a mail server or other messaging functionality for receiving and routing messages between the social networking system 130 and one or more client devices 110. The messages can be instant messages, queued messages (e.g., email), text and SMS messages, or any other suitable messaging format.

The Application Programming Interface (API) request server 220 allows one or more third-party websites 120 to access information from the social networking system 130 by calling one or more APIs. The API request server 220 also may allow third-party websites 120 to send information to social networking website by calling APIs. For example, a third-party website 120 sends an API request to the social networking system 130 via the network 140 and the API request server 220 receives the API request. The API request server 220 processes the request by calling an API associated with the API request to generate an appropriate response, which the API request server 220 communicates to the third-party website 120 via the network 140. For example, responsive to an API request, the API request server 220 collects data associated with a user and communicates the collected data to the third-party website 120. The data communicated includes survey result data according to one embodiment. In some instances, the API request server 220 may create and provide information for a third-party website 120 to include a tracking pixel 124 as described herein within a web page advertisement 122 provided on the third-party website 120.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 230. In one embodiment, the social networking system maintains the action log 230 as a database of entries. When an action is taken within the social networking system 130, an entry for the action is added to the action log 230.

Additionally, user actions may be associated with an entity outside of the core social networking system 130, such as a third-party website 120 that is separate from the social networking system website 130. For example, the action logger 215 receives data describing a user's interaction with a third party website 120 from the web server 210. Examples of actions where a user interacts with a third-party website 120 includes a user expressing an interest in a third-party website 120 or another entity, a user posting a comment to the social networking system 130 that discusses a third-party website 120, or a web page 122 within the third-party website 120, a user posting to the social networking system 130 a Uniform Resource Locator (URL) or other identifier associated with a third-party website 120, a user attending an event associated with a third-party website 120 or any other action by a user that is related to a third-party website 120. Thus, the action log 240 may include actions describing interactions between a social networking system user and a third-party website 120 that is separate from the social networking system 130.

Some actions taken with respect to a third-party website 120 separate from the social networking system 130 are logged separately according to one embodiment. For example, an ad exposure log 234 includes information associated with user exposure to a web page advertisement 122 provided by a third-party 120. When a user accesses a web page advertisement 122 and that exposure is reported to the social networking system 130, the ad exposure log 234 records the user identifier, the advertisement identifier, and the time and date of the access. In addition, other information may be logged such as an identifier of the ad placement, an identifier of the ad creative, a friend count for the user, whether the user "liked" an associated brand page, user interests and interest categories, etc. Alternatively, the ad exposure log 234 may be included within the action log 230. The ad exposure log 234 may be accessed by the control group generator 225 and other aspects of the social networking system 130 for using the data stored therein.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, third-party websites 120 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, all third-party websites 120, specific third-party websites 120, or all external systems. One embodiment allows the specification of the set of entries comprise an enumeration of entities, for example, the user may select a list of third-party websites 120 that are allowed to access certain information. Another embodiment allows the specification to comprise a set of entities along with exceptions that are not allowed to access the information. For example, a user may allow all third-party websites 120 to access the user's work information but specify a list of third-party websites 120 that are not allowed to access the work information. Certain embodiments call the list of exceptions that are not allowed to access certain information a block list. External systems, such as third-party websites 120, belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

The authorization server 235 contains logic to determine if certain information associated with a user can be accessed by a user's friends, third-party websites 120 and/or other applications and entities. For example, a third-party website 120 that attempts to access a user's comment about a URL associated with the third-party website 120 must get authorization from the authorization server 235 to access the user's work phone number. Based on the user's privacy settings, the authorization server 235 determines if another user, a third-party website 120, an application or another entity is allowed to access information associated with the user, including information about actions taken by the user. For example, the authorization server 235 uses a users privacy setting to determine if the user's comment about a URL associated with the third-party website 120 can be accessed by the third-party website 120. This enables a user's privacy setting to specify which other users, or other entities, are allowed to receive data about the user's actions or other data associated with the user.

The control group generator 225 is a means for building advertising control groups within the social networking system 130 according to one embodiment. The control group generator 225 is configured to interact with other aspects of the social networking system 130, such as the ad exposure log 234 and the demographic and behavioral information store 250. The control group generator 225 uses information in the log files to determine which users have been exposed to a particular web page advertisement 122, and can access demographic, behavioral, and/or information for exposed users, or can use the information to determine users who are similar to each other based upon their demographic, behavioral, and/or social information. The control group generator 225 can select subsets of users from all users, from exposed users, from users connected to the user, and from sets of users determined to be candidates for a control group of users not exposed to a particular web page advertisement 122, either through random selection or by applying rules to determine the subset. In this way, the control group generator 225 can determine and candidate control group, and ultimately a control group of users, who were not exposed to a web page advertisement 122 that other users with similar characteristics were exposed to, to determine advertising effectiveness. For example, the control group generator 225 may select users who have connections to an exposed user as the candidate control group, for estimating any effect on those connections based on the user viewing the advertisement, e.g., by discussion of the advertisement between the user and the user's connections outside of the social networking system 130.

The control group generator 225 also may generate surveys to issue to exposed and unexposed users.

The surveys or the user impression information itself can be used, for example, for retargeting the advertisement based on a user's past impressions for the advertisement, for richer reporting about an advertising campaign, or other modifications of the original advertisement.

Additionally, the social networking system 130 maintains data about objects with which a user may interact using the social networking system 130. To maintain this data, the user account store 240 and the connection store 245 store instances of the corresponding type of objects maintained by the social networking system 130. Each object type has information fields that are suitable for storing information appropriate to the type of object. For example, the user account store 240 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 240, assigns a unique identifier to the user profile, and begins to populate the fields of the user profile with information provided by the user.

The connection store 245 includes data structures suitable for describing a user's connections to other users, connections to third-party websites 120 or connections to other entities. The connection stores 245 may also associate a connection type with a user's connections, which may be used in conjunction with the user's privacy setting, further described above, to regulate access to information about the user. In addition, the connection store 245 may be accessed by other aspects of the social networking system 130, e.g., the control group generator 225, to obtain information about a user's connections for determining any effect of an advertisement on the connections of a user exposed to the advertisement.

The demographic and behavioral information store 250 includes data structures suitable for describing a user's demographic data, behavioral data, and other social data, which may be mined from the other logs 230, 234 and stores 240, 245 of the social networking system 130. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that isn't demographic or behavioral, such as interests or affinities, whether a user is trusted by the social networking system 130, etc. The demographic and behavioral information store 250 data can be accessed by the control group creator 225 or other aspects of the social networking system 130.

Determining Effectiveness of Advertisements External to the Social Networking System In order to assess effectiveness of advertisements outside the domain of the social networking system 130 or user registration site, tracking pixels 124 are embedded into advertisements on web pages 122 provided by a third party 120. The information for embedding the tracking pixel 124 is received by the third party 120 from the social networking system 130 user registration site. Each time a client device 110 accesses a web page advertisement 122 including a tracking pixel 124, the tracking pixel 124 enables the social networking system 130 or user registration site to log access to the web page advertisement 122 by the user associated with the device 110. In one embodiment, the tracking pixel 124 accesses a cookie 114 stored on the browser 112 by the social networking system 130 or user registration site, from which is retrieved a user identifier associated with the user of the client device 110 and sends the identifier to the social networking system 130 or user registration site along with identification of the web page advertisement 122. The social networking system 130 or user registration site logs access to the web page advertisement 122 by the user associated with the user identifier. According to another embodiment, upon download of the web page advertisement 122, the tracking pixel 124 requests the image associated with the tracking pixel 124 from the social networking system 130 or user registration site, and sends with the request a cookie 114 stored on the browser 112 by the social networking system 130 or user registration site; the social networking system 130 or user registration site responds with the image to complete rendering of the web. The social networking system 130 or user registration site determines the user account associated with the cookie 114, and logs access by the user to the web page advertisement 122. From the log files, the social networking system 130 or user registration site determines users exposed to the web page advertisement 122, and those not exposed, but with similar demographics and/or behavior information. The social networking system 130 or user registration site can use these two groups to provide surveys about the advertisement, with the unexposed group acting as a control group. The surveys may be provided by the social networking system 130 or user registration site, or by the third party 120.

FIG. 3A are interaction diagrams of embodiments of a process 300a, 300b for a social networking system 130 building log files tracking access to a web page advertisement 122 by users of a user registration site, e.g., the social networking system 130. In the embodiment shown by FIG. 3A, the third-party website 120 is separate from the social networking system 130. For example, the third-party website 120 may be a separate and distinct domain from the domain of the social networking system 130. Initially, the social networking system 130 maintains 305 user accounts for a plurality of users of the social networking system 130, and user demographic and behavioral information, as discussed in conjunction with FIG. 2. Upon access to the social networking system 130 by the user via a client device 110, the social networking system 130 sends 310 a cookie 114 to the device 110, which includes one or more parameters, e.g., a user identification associated with the user account. The cookie 114 may be sent upon the client device 110 first accessing the social networking system 130, or may be sent upon the first access by the client device 110 during a user session.

In one embodiment, the existence of cookie 114 in the browser 112 indicates that the user of the computing device 110 is a user of the social networking system 130 (e.g., whether the user has a valid user account with the social networking system 130). If the user of the computing device 110 is a user of the social networking system 130, the cookie 114 may contain information indicating whether the user is logged into the social networking system 130 (e.g., whether the user has a current valid session with the social networking system 130). Thus, the cookie 114 may be used by the social networking system 130 to authenticate the user session. In other embodiments, the social networking system 130 may determine only whether the user is a user of the social networking system 130, e.g., by checking for an existence of a cookie, without determining whether the user is logged into the social networking system 130. Although cookies are described herein for authenticating the user and/or the user session, any other methods of user or session identification or authentication may be used (such as recognizing a physical token).

At a later time (as indicated by wavy lines), a user device 110 requests 315 a web page advertisement 122 from a third-party website 120. For example, a user of the client device 110 enters a uniform resource locator (URL) or other identifier associated with the web page advertisement 122 into a browser application 112 operating on the user device 110, e.g., by typing in the URL or selecting a link to the page 122. The browser application 112 identifies the third-party website 120 associated with the received URL or other identifier and requests 315 the web page advertisement 122 associated with the received URL or other identifier from the identified third-party website 120.

After receiving the request for the web page advertisement 122, the third-party website 120 generates 320 the requested web page advertisement 122. The third-party website 120 includes in the web page advertisement 122 a tracking pixel 124 for providing tracking information about users of the social networking system 130. The tracking pixel 124 is an embedded object that is an invisible single pixel gif which, when executed by the browser application 112 of the client device 110, retrieves information from the cookie 114 for providing to the social networking system 130. For example, the tracking pixel 124 may embed using a <img src="GOTO" width="1" height="1"/> tag, where GOTO represents a URL or instructions, or both, and 1×1 is the size of the tracking pixel 124 (i.e., it is invisible to the human eye). The third-party website 120 generates 320 a markup language document 116 describing the content and formatting of the web page advertisement 122, which includes the tracking pixel 124, and which is sent 325 to the client device 110 for rendering 330 by the web browser 112. The tracking pixel 124 reads 335 the cookie 114 and sends 340 an identifier associated with the user of the client device 110 to the social networking system 130 along with identification of the web page advertisement 122. The social networking system 130 then creates 370 a log entry for the identifier, indicating that the user associated with the identifier has viewed the web page advertisement 122.

In the embodiment shown in FIG. 3B, steps 305 through 325 are the same as described in conjunction with FIG. 3A. However, the tracking pixel 124 is different. In this example, the tracking pixel 124 is an embedded object that is an invisible single pixel gif, for which the associated image is hosted on the social networking system 130. For example, the tracking pixel 124 includes a URL, or other web page identifier, associated with the social networking system 130 and the location of the image associated with the tracking pixel 124 within the social networking system 130. Thus, when the web page advertisement 112 is rendered 330 by the browser 112, a request 350 is sent to the social networking system 130 for the image, and the cookie 114 previously stored by the browser 112 is sent to the social networking system 130 unchanged as part of the request, along with an identifier of the web page advertisement 122. The social networking system 130 responds 355 to the request with the (invisible) pixel image, and the browser 112 completes the rendering 330. From the cookie 114, the social networking system 130 determines 360 the associated user, and logs 370 an entry indicating that the user has accessed the web page advertisement 122.

Thus, for each user exposed to the web page advertisement 122, a log entry is created identifying the web page advertisement 122 and the user. The user is identified by a user account in the social networking system 130, which is either received directly from the client device 110 (e.g., because the tracking pixel 124 has read it from the cookie 114; FIG. 3A) or is ascertained from the cookie 114 received from the client device 110 (FIG. 3B). The user associated with the client device 110 is the user logged into the social networking system 130 at the time the web page advertisement 122 is accessed, or if no user is logged in, the user most recently logged into the social networking system 130 via the client device 110.

Next, the social networking system 130 builds a control group of users of the social networking system 130 not exposed to the web page advertisement 122 from the log files. An exposed subset of users of the social networking system 130 is determined based on the log entries of advertising exposures, and a candidate control group of users is generated by comparison of the demographic and behavior information between selected users of the social networking system 130 and the exposed subset of users. Any users from the candidate control group exposed to the web page advertisement 122 are eliminated, yielding a control group of users not exposed to the web page advertisement 122.

Figure 4:
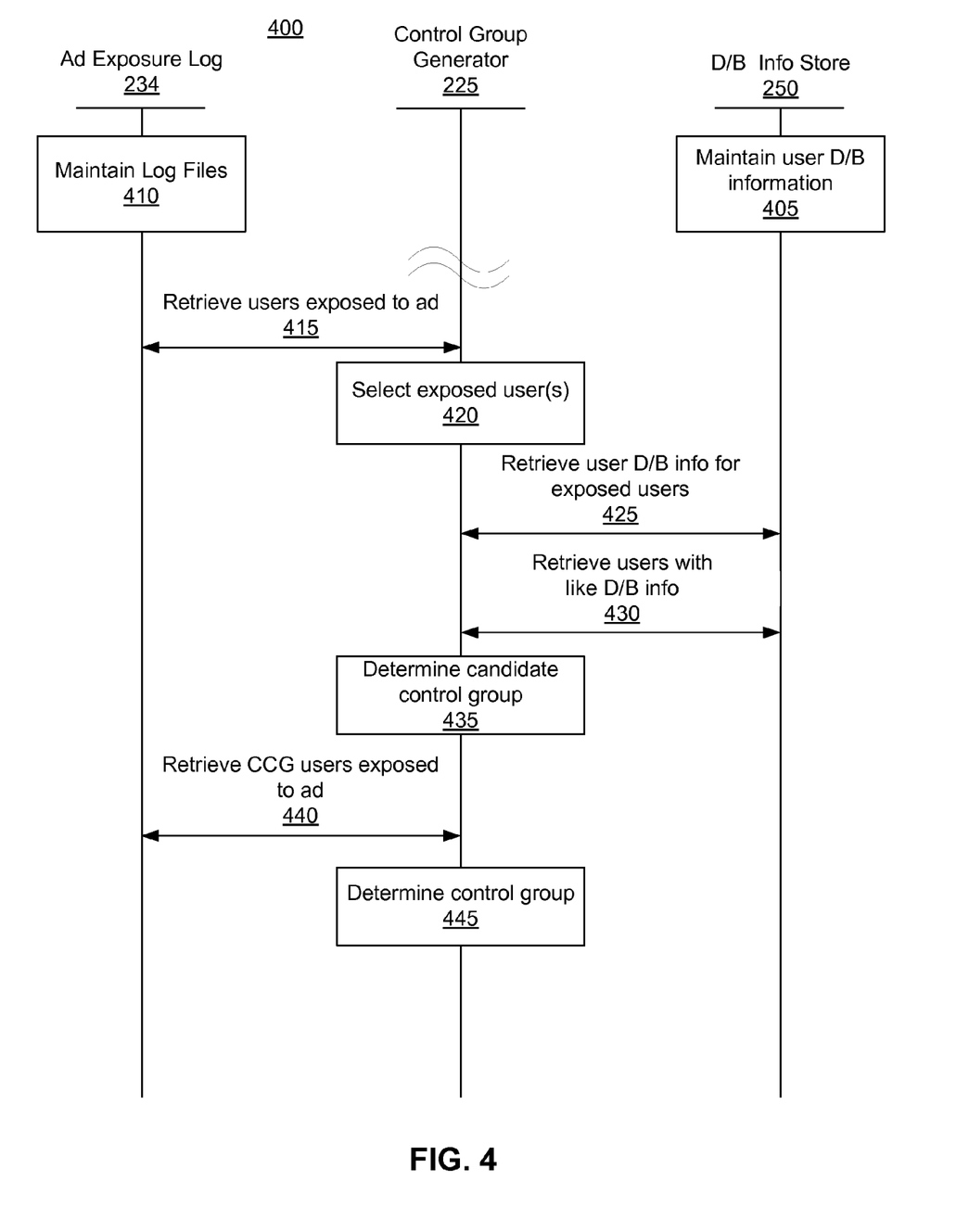
FIG. 4 is an interaction diagram of one embodiment of a process for building a control group of unexposed users of the social networking system.

FIG. 4 is an interaction diagram of one embodiment of a process 400 for building an advertising control group within the social networking system 130 or user registration site. Initially, the social networking system 130 maintains 405 demographic and behavior information for each user, e.g., as described in conjunction with the D/B info store 250, and maintains log files of exposures to web page advertisements 122, e.g., in ad exposure log 234. Sometime later, as indicated by wavy lines, the social networking system 130, e.g., via control group generator 225, determines users exposed to the advertisement by retrieving 415 exposed user information from the log files. From the exposed users, the social networking system 130 selects 420 a subset of the exposed users, e.g., randomly or by any other method. The social networking system 130 then retrieves 425 user demographics and behavioral information for the subset of exposed users. Alternatively, steps 420 and 425 could be reversed: the social networking system 130 could retrieve 425 the demographics and behavioral information for all exposed users, and then select 420 a subset of the users for comparison. In some cases the subset may be the whole.

Next, the demographics and behavioral information for the subset of exposed users is used to determine a candidate group of unexposed users with similar information. First, using the stored demographic and behavior information, the social networking system 130 retrieves 430 a list of users with similar information to those exposed to the advertisement, from which a candidate control group can be determined 435. However, because the comparison is to users of the social networking system 130 generally, the candidate group might include some users who have in fact been exposed to the advertisement. Thus, the social networking system 130 then retrieves 440 information about whether any of the candidate control group have been exposed to the advertisement, who are removed from the group to create 445 the control group of unexposed users. The exposed and control groups then can be surveyed to determine the effectiveness of the advertisement.

In another embodiment, the exposure information can be used to retarget advertisements based on whether a user has already been exposed to the advertisement, or based on the number of impressions for the user. For example, an advertiser can use the advertisement exposure information to determine whether to serve another advertisement to a particular user of the plurality of users. The determination can be based on various intentions of the advertiser, such as whether the advertiser wants to send the advertisement again to an exposed user, to send the advertisement only to unexposed users, or to provide a second related advertisement only to users who have been exposed to a first advertisement.

The advertising exposure information can also be used for measuring advertisement effectiveness on connections of exposed users, which may happen by discussion of the advertisement between the user and the user's connections within or outside of the social networking system. For example, in one embodiment, the system determines exposed users, as discussed above, and then surveys the effects on the friends of those exposed users, thereby measuring the indirect effects of an advertisement.

In another embodiment, instead of using surveys, the effect of the advertisements can be measured in terms of the actions of the exposed users within the social networking system that relate to the advertising to which the user was exposed. Such action may include, for example, "liking" or commenting on a product that is the subject of an advertisement to which the user was exposed. These actions provide another possible measure of the effectiveness of the advertisement.

In addition, the surveys or the user impression information itself can be used to provide richer reporting about an advertising campaign, or as a basis for other modifications of the original advertisement.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein. For example, in one embodiment the computer-readable storage medium contains a markup language document for being rendered by a web browser application executing on a computer system. In this embodiment, the markup language document comprises information items encoded in a markup language comprising instructions for rendering information from a third-party website in a web browser application, as well as instructions to a web browser application to retrieve information associated with a user of a social networking system, as described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for measuring advertising effectiveness for advertisements external to a social networking system, the method comprising:
   for each of a plurality of users of the social networking system:
      maintaining demographic and behavior information associated with the user, and
      sending a social networking system cookie to a client device associated with the user of the social networking system;
   building a log of user advertising exposures outside of the social networking system by, for each of the plurality of users exposed to an advertisement, creating a log entry indicating that the user has been exposed to the advertisement; and
   building a control group of unexposed users of the social networking system, the control group selected by comparing the demographic and behavior information between selected unexposed users of the plurality of users with at least a subset of the users exposed to the advertisement;
   wherein at least one exposed user and at least one control group user are provided a survey to determine the effectiveness of the advertisement.

2. The method of claim 1, wherein building a log of user advertising exposures outside of the social networking system further comprises, for each of the plurality of users exposed to an advertisement:
   receiving an indication of the advertisement accessed by the client device; and
   receiving identification of the user associated with the client device.

3. The method of claim 2, wherein the identification of the user associated with the client device is a user identifier for the social networking system.

4. The method of claim 2, wherein the identification of the user associated with the client device is the social networking system cookie, the method further comprising:
   determining a user identifier from the social networking system cookie.

5. The method of claim 2, further comprising:
   sending, to a provider of the advertisement, information for embedding a tracking pixel in the advertisement, wherein the tracking pixel enables the identification of the user associated with the client device.

6. The method of claim 1, wherein the user advertising exposures are monitored using a tracking pixel embedded in the advertisement.

7. The method of claim 1, wherein building a control group of unexposed users of the social networking system further comprises:
   determining the exposed subset of users based on the log of user advertising exposures;
   generating a candidate control group of users of the social networking system selected by comparison of the demographic and behavior information of selected users of the plurality of users with the demographic and behavior information associated with the exposed subset of users; and
   eliminating from the candidate control group those of the selected users who have a log entry indicating that they have been exposed to the advertisement, thereby forming the control group of unexposed users.

8. The method of claim 7, wherein the selected users are randomly selected from the plurality of users.

9. The method of claim 1, wherein demographic and behavior information associated with the user comprises at least one selected from the group consisting of: demographic data, behavioral data, and other social data.

10. The method of claim 1, further comprising:
    for each of the plurality of users of a social networking system, maintaining a set of connections with other users of the plurality of users;
    wherein generating the candidate control group of users of the social networking system comprises comparison of the demographic and behavior information of one of the exposed subset of users to the demographic and behavior information for a selected user who is among the set of connections of the one of the exposed subset of users.

11. The method of claim 1, further comprising:
    providing the survey to the at least one exposed user and at least one control group user.

12. The method of claim 1, further comprising:
    providing survey result data to a provider of the advertisement.

13. A method for surveying advertising effectiveness for advertisements external to a social networking system, the method comprising:
    for each of a plurality of users of the social networking system:
        maintaining a user account including demographic and behavior information associated with the user,
        sending a social networking system cookie to a client device associated with the user of a social networking system;
    building a log of user advertising exposures outside of the social networking system by, for each of the plurality of users exposed to an advertisement:
        receiving an indication of the advertisement accessed by the client device,
        receiving an identification of the user associated with the client device, and
        creating a log entry in the log of user advertising exposures indicating that the user has been exposed to the advertisement; and
    building a control group of unexposed users of the social networking system, by:
        determining an exposed subset of users of the social networking system comprising users exposed to the advertisement based on the log of user advertising exposures,
        generating a candidate control group of users of the social networking system, the candidate control group of users selected by comparison of the demographic and behavior information of selected users of the plurality of users with the demographic and behavior information associated with the exposed subset of users, and
        eliminating from the candidate control group those of the selected users who have a log entry indicating that they have been exposed to the advertisement, thereby forming the control group of unexposed users of the social networking system;
    wherein at least one exposed user and one control group user are provided a survey to determine the effectiveness of the advertisement.

14. A method for building a log of user advertising exposures external to a social networking system, the method comprising:
    for each of a plurality of users of the social networking system:
        maintaining demographic and behavior information associated with the user, and
        sending a social networking system cookie to a client device associated with the user during a user session;
    sending, to a provider of an advertisement, information for embedding a tracking pixel into the advertisement on a web page associated with the provider; and
    for each of the plurality of users exposed to the advertisement:
        receiving an indication of the advertisement accessed by the client device,
        receiving the cookie identifying the user associated with the client device during the user session, the identification enabled by the tracking pixel locating the cookie on the client device, and
        creating a log entry in the log of user advertising exposures indicating that the user has been exposed to the advertisement.

15. The method of claim 14, further comprising:
    determining, based on the log of user advertising exposures, whether to serve the advertisement again to a particular user of the plurality of users.

16. The method of claim 15, wherein the particular user was exposed to the advertisement, and wherein determining whether to serve the second advertisement comprises determining whether to serve the advertisement to the particular user an additional time.

17. The method of claim 15, wherein determining whether to serve the second advertisement comprises serving the advertisement only if the particular user was not exposed to the advertisement.

18. The method of claim 14, further comprising:
    determining, based on the log of user advertising exposures, whether to serve a second advertisement to a particular user of the plurality of users, wherein the second advertisement is served to the particular user only if the particular user was previously exposed to the advertisement.

19. The method of claim 14, further comprising:
    for each of the plurality of users of a social networking system, maintaining a set of connections with other users of the plurality of users;

measuring advertisement effectiveness by surveying users from the set of connections who have not been directly exposed to the advertisement.

20. The method of claim 14, further comprising:
measuring actions of the exposed users within the social networking system associated with the advertisement.

21. The method of claim 14, wherein the identification of the user associated with the client device is a user identifier for the user in the social networking system.

22. The method of claim 14, further comprising:
sending, to a provider of the advertisement, information for embedding the tracking pixel in the advertisement.

23. The method of claim 14, further comprising:
building a control group of unexposed users of the social networking system, selected by comparing the demographic and behavior information between selected unexposed users of the plurality of users with a subset of the users exposed to the advertisement; and
wherein at least one exposed user and at least one control group user are provided a survey to determine the effectiveness of the advertisement.

24. The method of claim 14, wherein the demographic and behavior information associated with the user comprises at least one selected from the group consisting of: demographic data, behavioral data, and other social data.

25. The method of claim 14, further comprising:
for each of the plurality of users of a social networking system, maintaining a set of connections with other users of the plurality of users,
wherein generating the candidate control group of users of the social networking system comprises comparison of the demographic and behavior information of one of the exposed subset of users to the demographic and behavior information for a selected user who is among the set of connections of the one of the exposed subset of users.

26. A method for building an advertising control group within a social networking system, the method comprising:
for each of a plurality of users of the social networking system, maintaining demographic and behavior information associated with the user;
maintaining a log of user advertising exposures outside of the social networking system;
determining an exposed subset of users of the social networking system comprising users exposed to an advertisement, the exposed subset of users determined based on the log of user advertising exposures;
generating a candidate control group of users of the social networking system, the candidate control group of users selected by comparison of the demographic and behavior information of selected users of the plurality of users with the demographic and behavior information associated with the exposed subset of users;
eliminating from the candidate control group those of the selected users who have an entry in the log of user advertising exposures indicating that they have been exposed to the advertisement, thereby forming the control group of unexposed users of the social networking system.

27. The method of claim 26, further comprising:
providing a survey to at least one user from the exposed subset of users and at least one user from the control group.

28. The method of claim 26, wherein the selected users are randomly selected from the plurality of users.

29. The method of claim 26, wherein demographic and behavior information associated with the user comprises at least one selected from the group consisting of: demographic data, behavioral cluster data, and other social data.

30. The method of claim 26, wherein generating the candidate control group of users of the social networking system comprises comparing the demographic and behavior information associated with each user from the exposed subset of users to find a match within the demographic and behavior information of the plurality of users.

31. The method of claim 26, further comprising:
for each of the plurality of users of a social networking system, maintaining a set of connections with other users of the plurality of users;
wherein generating the candidate control group of users of the social networking system comprises comparison of the demographic and behavior information of one of the exposed subset of users to the demographic and behavior information for a selected user who is among the set of connections of the one of the exposed subset of users.

32. The method of claim 26, further comprising:
providing the survey to the at least one exposed user and at least one control group user.

33. The method of claim 26, further comprising:
providing survey result data a provider of the advertisement.

34. A method for measuring advertising effectiveness for advertisements external to a user registration site, the method comprising:
for each of a plurality of users of the user registration site:
maintaining demographic and behavior information associated with the user, and
sending a user registration site cookie to a client device associated with the user of the user registration site;
building a log of user advertising exposures outside of the user registration site by, for each of the plurality of users exposed to an advertisement, creating a log entry indicating that the user has been exposed to the advertisement; and
building a control group of unexposed users of the user registration site, the control group selected by comparing the demographic and behavior information between selected unexposed users of the plurality of users with at least a subset of the users exposed to the advertisement;
wherein at least one exposed user and at least one control group user are provided a survey to determine the effectiveness of the advertisement.

* * * * *